United States Patent [19]

Arnold

[11] 4,451,238
[45] May 29, 1984

[54] SHAFT BRAKE FOR MARINE PROPULSION SYSTEM

[75] Inventor: Bruce C. Arnold, Racine, Wis.

[73] Assignee: Twin Disc, Incorporated, Racine, Wis.

[21] Appl. No.: 415,332

[22] Filed: Sep. 7, 1982

[51] Int. Cl.³ .......................................... B63H 23/08
[52] U.S. Cl. .................................... 440/75; 192/0.09; 192/0.094; 192/4 C; 440/74
[58] Field of Search .................. 114/74, 75; 192/4 C, 192/0.08, 0.092, 0.09, 0.094

[56] References Cited

U.S. PATENT DOCUMENTS 3,003,606 10/1961 Hindmarch ........................ 192/4 C

*Primary Examiner*—Sherman D. Basinger
*Attorney, Agent, or Firm*—James E. Nilles

[57] ABSTRACT

A marine propulsion system for a water craft comprises a relatively large engine or power plant and a power transmission including an output shaft for driving the propeller. The power transmission includes forward and reverse shafts, gear trains between these shafts and the output shaft, and clutches for the forward and reverse shafts. A shaft brake is provided to stop rotation of the output shaft for the propeller which minimizes damaging shocks to the propulsion system which sometimes occur during maneuvering operations. The brake is located concentrically with the forward shaft of the power transmission and is effective to brake the propeller shaft through interconnecting gears when both clutches are disengaged.

7 Claims, 10 Drawing Figures

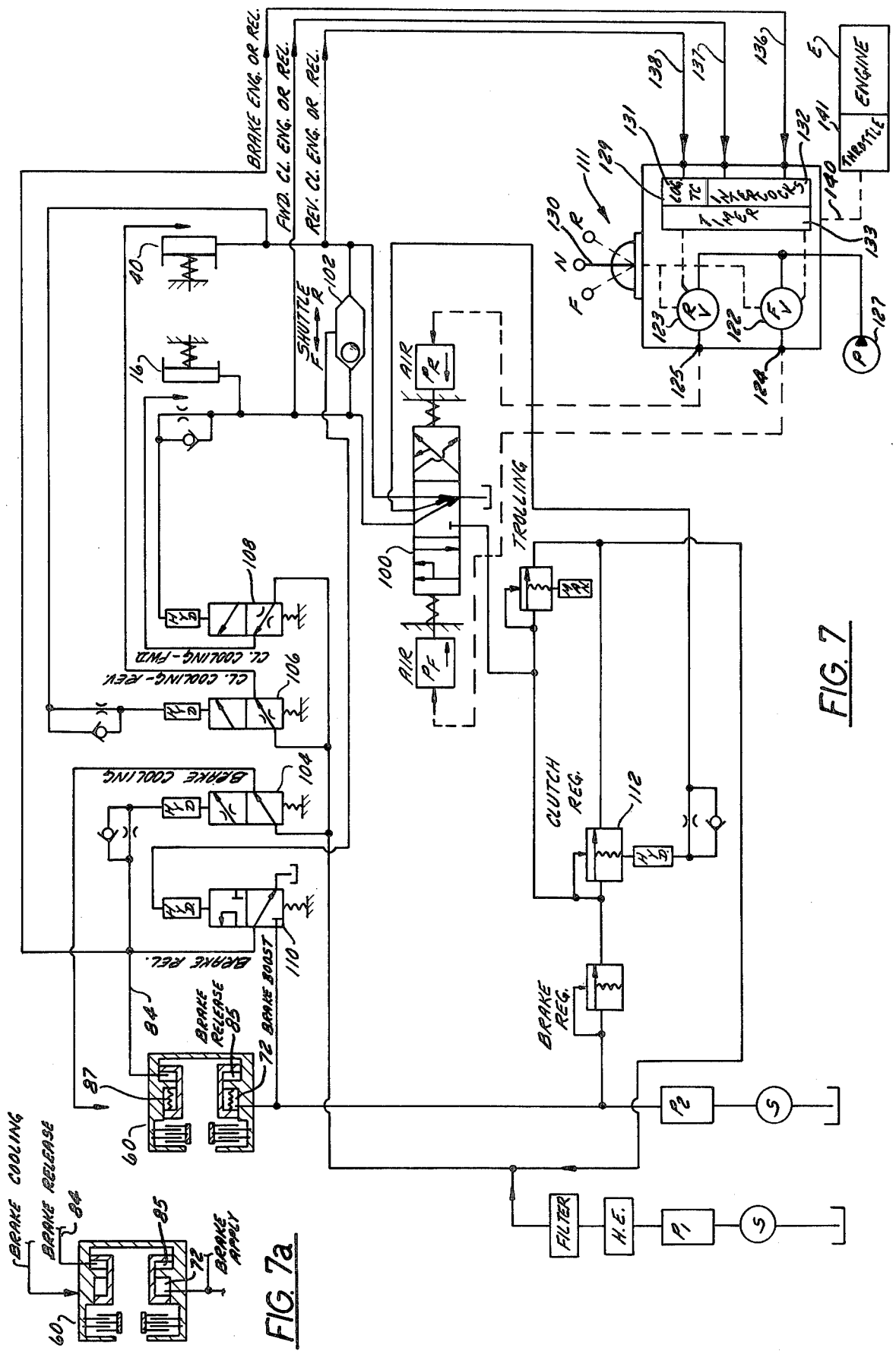

SHAFT BRAKE FOR MARINE PROPULSION SYSTEM

BACKGROUND OF THE INVENTION

With the increase in horsepower within small envelopes of diesel engines which are in use in the marine industry today, certain problems have arisen in the propulsion system such as shock loads which occur during maneuvering operations. Maneuvering of the craft with high horsepower, high speed engines creates excessive loading on the engines and wear on gears, propellers and shafts. Larger horsepower engines, running at high rotation speeds, require large reduction ratios in the reverse reduction marine gears. In many situations, the combination of engine and propeller through the large reduction ratio has resulted in severe loading on the engine and possible engine stalling during high speed maneuvering.

Some prior art output shaft brakes for such transmissions are connected directly to the output shaft and are the conventional dry friction material type of air applied clutches. These brakes have controls which are tied in pneumatically with the engine-marine transmission control system that actuates the propulsion system. In those typical operations, when the propulsion engine is running and the transmission selector valve is in neutral, the brake is applied. When the vessel control lever is moved to engage the forward clutch, the air control system first disengages the brake and then engages the forward clutch to initiate the forward motion. If the vessel control lever is moved from forward through neutral to reverse, the prior air control system first senses that the forward clutch pressure has decayed to zero and this feedback signal then permits the pneumatic controls to engage the output shaft brake. A pneumatic timing arrangement applies the brake for a few seconds and then releases the brake. When the pneumatic control system through a feedback signal senses that the brake has released, then the control system initiates the engagement of the reverse clutch. In practice the pneumatic control systems may be designed to provide "boost" to the engine throttle to prevent engine stalling as the opposite direction clutch is engaged but this is not a requirement to the basic control function. Since the usual output shaft brake uses dry friction materials, it is only air cooled and consequently dissipating the energy absorbed during stopping of the propeller can be a serious difficulty if maneuvering occurs in rapid sequence.

SUMMARY OF THE PRESENT INVENTION

The present invention provides a shaft brake for a marine transmission of the type having a change speed gear system including several transmission shafts and through which the power is delivered from the engine to the propeller shaft. A more specific aspect of the invention relates to a multiple, interleaved friction plate brake acting between a forward shaft of the transmission and the output or propeller shaft of the transmission, the forward shaft on which the brake is mounted concentrically and the propeller shaft are interconnected by meshing gears which provides the brake with exceptionally good mechanical advantage in braking the propeller shaft. The brake is located concentrically with the forward shaft centerline and reduces the torque capacity requirement of the brake because the output gear set acts to reduce the torque feedback to the brake from the propeller that is being stopped. The present brake arrangement furthermore provides for the marine transmission lubricant to be circulated through the interleaved clutch plates to rapidly dissipate the heat which is generated during the propeller stopping sequence.

The clutch engaging pressure, either forward or reverse, is utilized to cause a shuttle valve to move in the direction that applies clutch engaging pressure as a pilot pressure to a brake-release spool. When the spool is moved by the clutch engaging pressure, it permits high pressure oil to enter the brake release cylinder and initiate brake release. Simultaneous with that action, a signal valve which is operated by clutch engaging pressure cuts off the flow of priority lubricant and cooling flow to the brake plate stack and also directs a priority flow of lubricant and cooling flow to the engaging clutch-plate stack. If the transmission control lever is again moved to neutral, the pilot pressure decays in the portion of the control valve which was directing priority cooling flow to the engaged clutch, and thereby the valve spool moves to disengage this priority flow of fluid. At the same time, the pilot pressure to the brake cooling spool goes to zero and that cavity is then vented to the sump, thus priority lubricant flow is again directed to the brake. A similar action occurs on the brake release pilot cavity and this spool vents the brake release pressure to sump and the output shaft brake is then engaged by the combined action of the brake springs and the brake pressure boost piston. An alternate design uses only high pressure hydraulic fluid to engage the brake.

A more specific aspect of the invention contemplates the use of air controls utilizing feedback pressure to signal the control system if the brake is engaged or released and also a feedback pressure signal if the forward clutch is engaged or released, and the feedback pressure is utilized if the reverse clutch is engaged or released. Thus the air control system permits sequencing from neutral to forward to reverse.

BRIEF DESCRIPTION OF THE DRAWINGS

FIG. 7 is a hydraulic circuit of the present invention and with the shaft brake engagement of FIG. 5;

FIG. 7A is a fragmentary view of a modification of the brake portion of FIG. 7 and showing the FIG. 5A brake modification;

DESCRIPTION OF A PREFERRED EMBODIMENT

Figure 1:
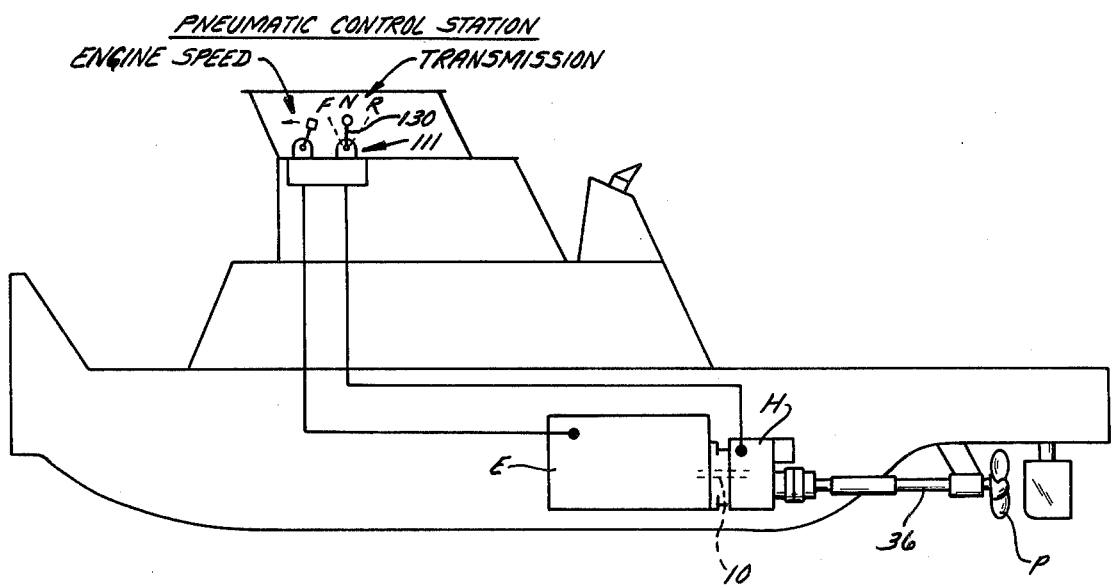
FIG. 1 is a schematic view of a tow boat in which an engine and marine transmission assembly of the present invention is installed.
Figure 2:
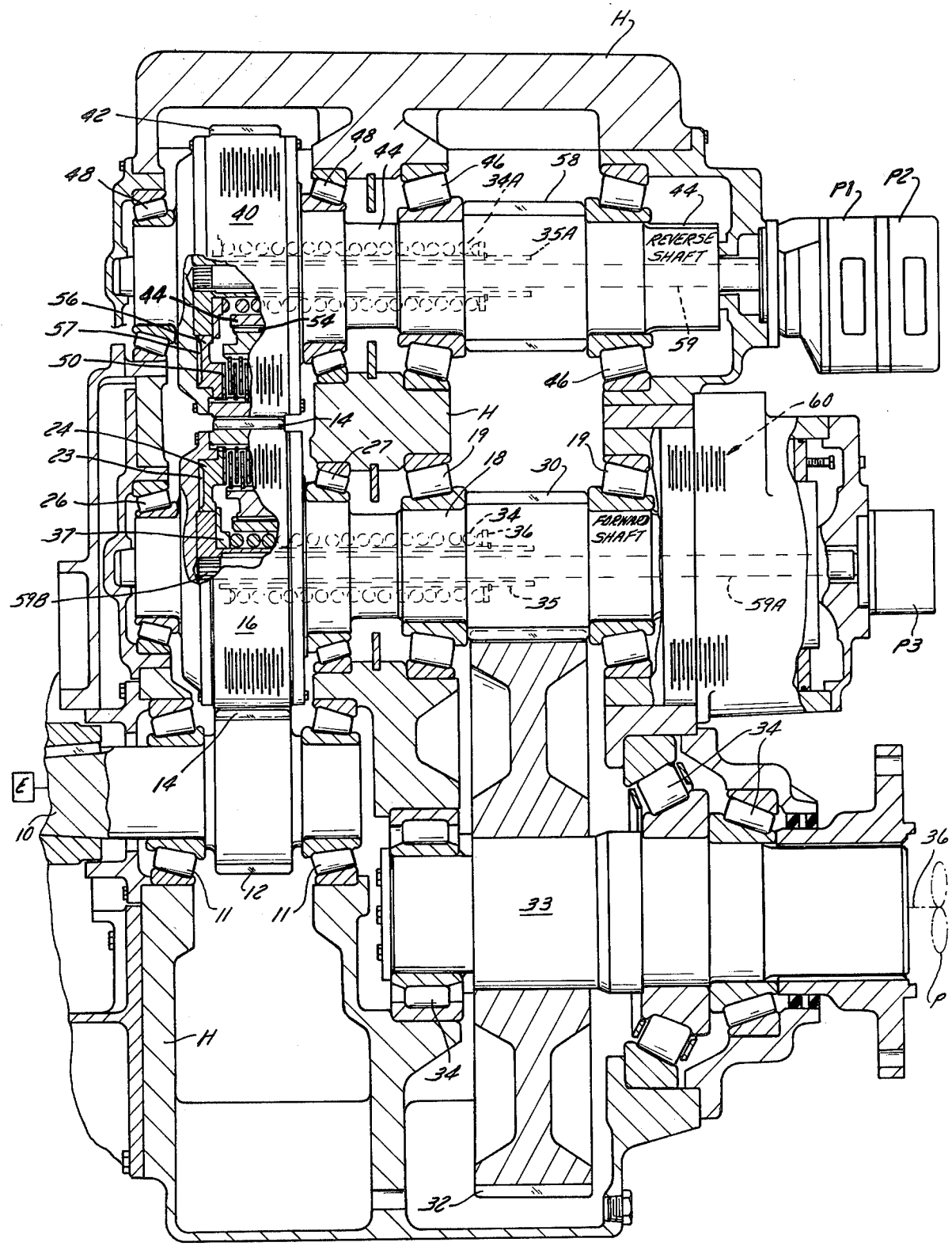
FIG. 2 is a sectional, spread-out view of the transmission of the present invention, certain parts being shown as broken away or removed for the sake of clarity in the drawings.

FIGS. 1 and 2, respectively, show the general environment and the general organization of the transmission with which the invention finds particular utility. The invention finds particular utility as a marine gear transmission for transmitting power from the power source, such as a diesel engine E for example, to the propeller P. Power is transmitted from the engine to a transmission input shaft 10 which is mounted on suitable anti-friction bearing assemblies 11 in a housing H. A pinion gear 12 formed integrally on shaft 10 is in constant mesh with gear 14 of the forward clutch 16. A forward tubular shaft 18 is journalled in anti-friction bearing assemblies 19 mounted in the housing H.

Figure 3:
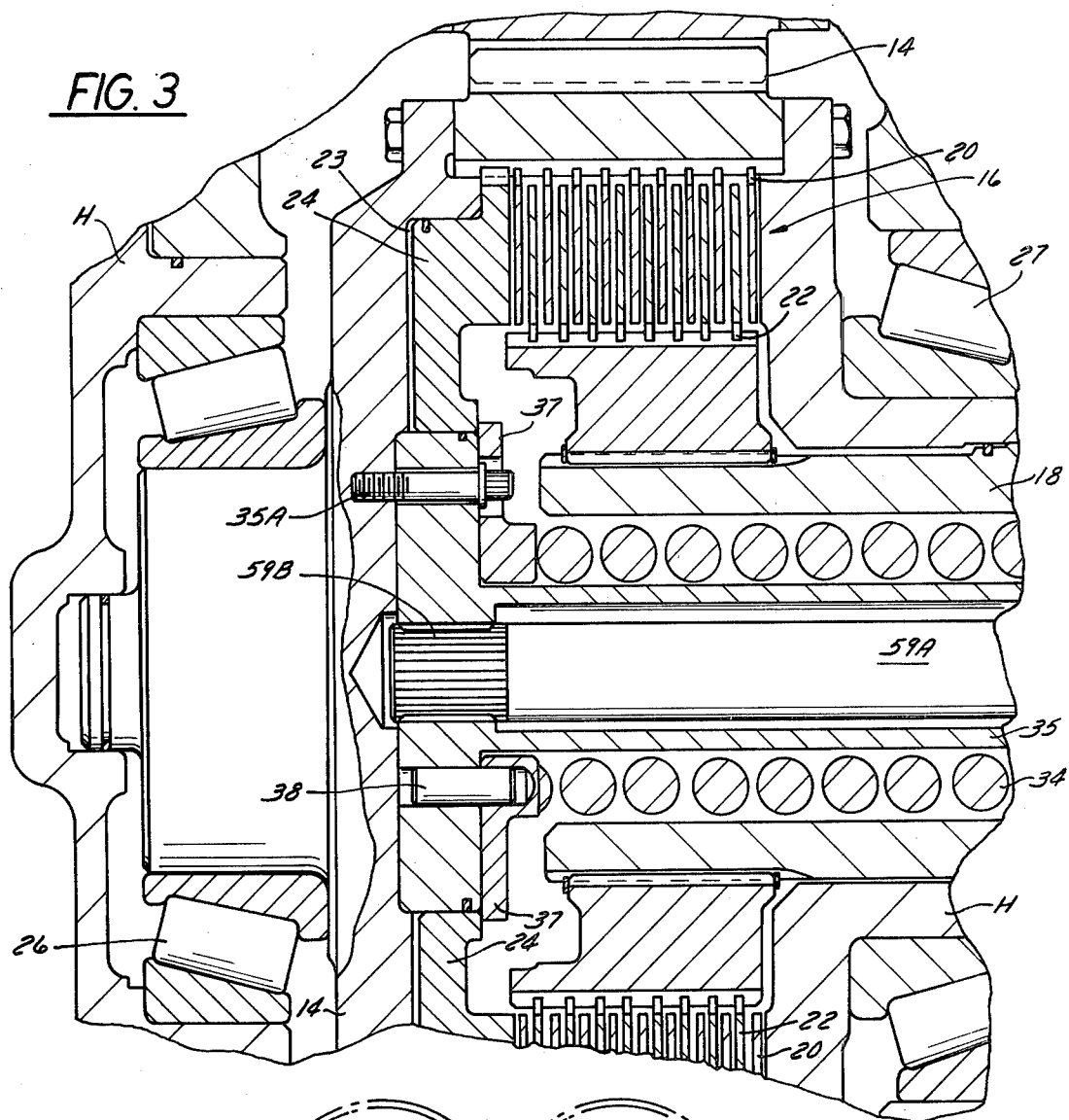
FIG. 3 is a sectional view of a portion of the transmission shown in FIG. 2, but on an enlarged scale and showing the forward clutch.
Figure 4:
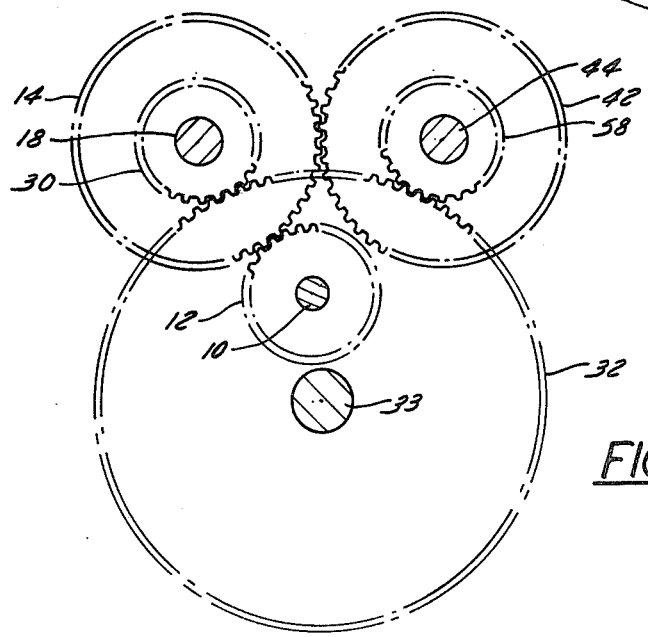
FIG. 4 is a transverse, schematic, sectional view of the transmission shown in FIG. 2, but on a reduced scale.

Interleaved outer and inner friction clutch plates 20 and 22, respectively, (FIG. 3) are secured at their outer and inner peripheries, respectively, in the known manner to the gear 14 and to the shaft 18. When piston chamber 23 is pressurized, a hydraulically actuated piston 24 acts to clamp up the interleaved clutch plates to thereby engage the clutch, and form a driving connection between the gear 14 and the shaft 18.

The gear 14 is journalled in the anti-friction bearing assemblies 26 and 27 which are mounted in housing H, in the known manner. The forward shaft also has a pinion gear 30 formed thereon which is in constant mesh with a large gear 32 fixed on an output shaft 33 which in turn is suitably journalled in the frame on anti-friction bearing assemblies 34. The output shaft 33 is connected to a propeller shaft 36 to drive the propeller P. When the clutch 16 is engaged, power is transmitted from the engine, through clutch 16, forward shaft 18 and its gear 30, gear 32 and the output shaft 33 to drive the propeller in the forward direction.

The forward clutch 16 is held in a released or disengaged position by a large coil spring 34 mounted around a tubular member 35 that in turn is secured by cap bolts 35A (FIG. 3) at its one end to the gear 14. The spring 34 abuts against a stop 36 (FIG. 2) fixed to and adjacent one end of the tubular member 35. The other end of the spring 34 abuts against a disc 37 which is axially slideably mounted on guidepins 38 (FIG. 3) in gear 14 and is located around the tubular member 35. The disc 37 engages the piston 24 to urge it to the clutch released position to the left as viewed in FIG. 3 when chamber 23 is not pressurized.

Another hydraulically actuated friction plate type clutch 40 (FIG. 2) is constructed and arranged similarly to clutch 16 and is also mounted in the housing and has an external gear 42 in constant mesh with gear 14 of the clutch 16. Clutch 40 is on the reverse shaft 44 which is suitably journalled in anti-friction bearings 46 in the housing. The gear 42 of clutch 40 is mounted in suitable anti-friction bearings 48 and has externally toothed friction plates 50 which are interleaved with the internally toothed friction plates 52, the plates 52 being secured by their teeth to the splines 54 of the reverse shaft, in the known manner. A piston 56 which is hydraulically actuated when its chamber 57 is pressurized, acts to clamp up the clutch plates to cause clutch engagement. Thus when the clutch 16 is disengaged and the clutch 40 is engaged, power is transmitted from the input shaft 10 through its gear 12, and then through gear 14 of the disengaged forward clutch 16, through gear 42 of the engaged clutch 40, through the shaft 44 and the pinion gear 58 formed thereon. Gear 58 is in constant mesh with gear 32 of the output shaft so that power is transmitted in the reverse direction to the propeller.

Clutch 40 is held in the disengaged position when its actuating chamber is unpressurized by a spring 34A mounted on a tubular member 35A and bearing against piston 56, similar to the clutch release described above for clutch 16.

A dual section hydraulic pump P1 and P2 (FIG. 2) is secured to and driven by the end of a shaft 59 extending through the tubular reverse shaft 44. Pump P1 is the lubrication cooling flow pump. Pump P2 is the high pressure fluid pump, the flow of which also cascades through regulator valves (shown in FIG. 2) into the lube-cooling flow passages, as will appear. Shaft 59 is connected by splines to and driven by the gear 42. An optional auxiliary hydraulic pump P3 can be secured to and driven by a shaft 59A extending through the tubular shaft 18. Shaft 59A is secured by splines 59B (FIG. 5) to and driven by gear 14.

An output brake 60 is formed concentrically with and is attached to the rearward end of the forward shaft 18. By placing the brake in this location, the torque capacity requirement of the brake is reduced because the output gear 32 acts to reduce the torque which is fed back to the brake by the propeller P that is being stopped.

Figures 5, 6:
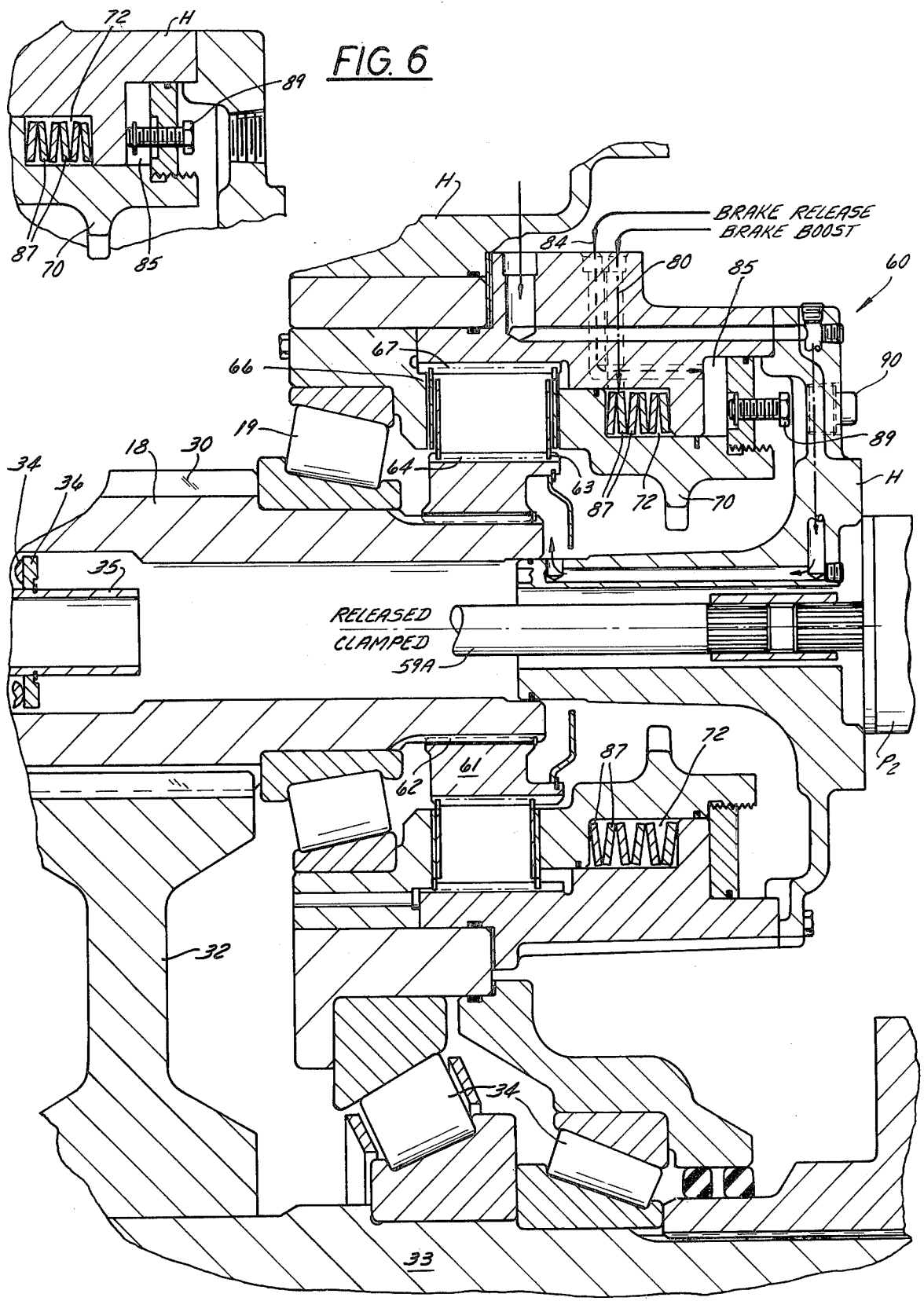
FIG. 5 is a sectional view of a portion of the transmission shown in FIG. 2, but on an enlarged scale and showing the partially spring engaged and partially hydraulically engaged shaft brake.
FIG. 6 is a fragmentary, sectional view of a portion of the brake shown in FIG. 5, but on an enlarged scale.
Figure 5A:
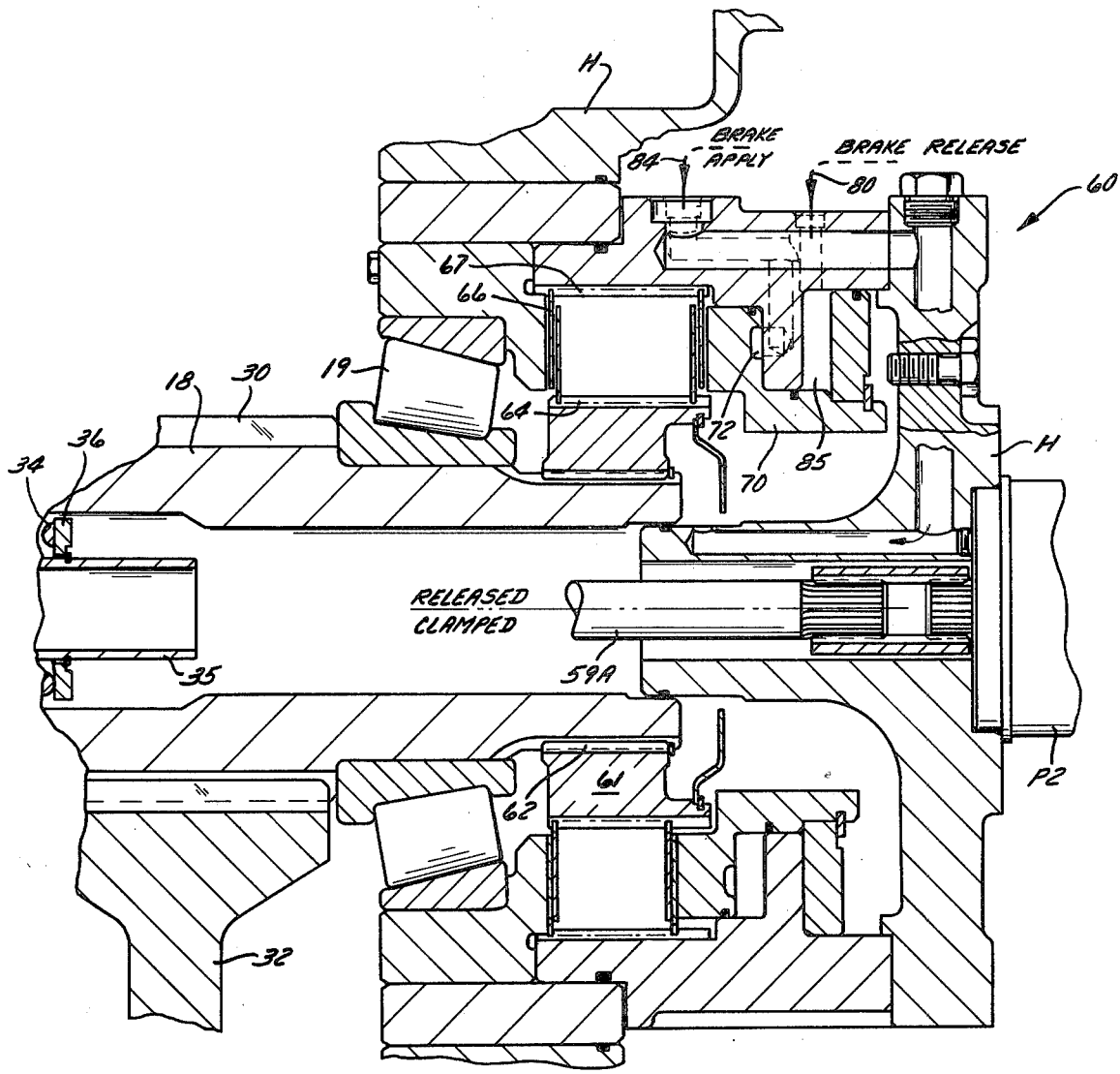
FIG. 5A is a view similar to FIG. 5 but showing the shaft brake as being completely hydraulically engaged.

FIGS. 5 and 5A show the structure and arrangement of the brake 60 and includes a hub 61 secured by splines 62 to the rear end of the shaft 18. FIG. 5 shows the partially spring engaged and partially hydraulically engaged brake. FIG. 5A shows a fully hydraulically engaged brake.

Brake clamp-up position is shown in the lower portion of FIGS. 5 and 5A and the brake is shown engaged in the lower portion of FIGS. 5 and 5A and the brake is shown released in the upper portion of these figures. Internally toothed plates 63 are secured to the peripherally splined portion 64 of the hub 61. Externally toothed plates 66 are splined to the internal teeth 67 of the housing H. In this manner, the interior set of plates 63 is secured to the forward shaft, and the outer set of plates 66 is anchored in the housing.

A series of Belleville springs 87, located in chamber 72 are used to engage the brake when the transmission is in neutral and the propulsion engine is stopped. The spring actuated capacity is intended to be adequate to prevent the propeller from free-wheeling if the vessel is docked in a current.

The interleaved plates 63 and 66 are clamped by the action of the piston 70 when the fluid actuating expansible chamber 72 is pressurized with fluid. Pressure fluid is introduced from the pressure source, such as the pump P2 and into the passage 80 which is in communication with actuating chamber 72, and this pressure supplements the spring apply force to provide design brake capacity with the engine running. The brake is released when pressure fluid is introduced from a source, such as hydraulic pump P2, and into passage 84 which is in communication with the brake release chamber 85, and overcome the force of the springs 87 to thereby release the brake.

Springs 87 are for brake application at partial capacity when the engine is not running.

The spring supplied brake dynamic capacity is approximately ¼ that of the hydraulic assisted brake static capacity. The hydraulic assisted brake static capacity, on the other hand, is approximately two times the hydraulic assisted brake's dynamic capacity.

A set of mechanically adjusted screws 89 are used to mechanically release the brake for service work or for temporarily disabling the brake operation for some other reason. These screws 89 are accessible by removing the plug 90 in the rear end of the housing.

The above described transmission and brake design locates the brake concentrically with the forward shaft centerline. This arrangement reduces the torque required of the brake due to the fact that the output gear acts to reduce the torque which is fed back to the brake by the propeller that is being stopped. The present brake arrangement also provides for the transmission lubricant to be circulated through the interleaved plates to rapidly dissipate the heat which is generated during the propeller stopping sequence. The present hydraulic circuit of this transmission to be presently described can be used to control the brake and the brake can be cooled in an efficient manner. The present hydraulic circuit applies pressure fluid to the clutches and also applies pressure fluid to the brake, which results in a simplified arrangement. The proper timing of the actuation of the various components is assured by an air operated control 111, as will now be described.

FIG. 7 is a schematic diagram of a hydraulic circuit made in accordance with the present invention for use in the braking system above described.

The general arrangement of the circuit shown in FIG. 7 includes a forward-neutral-reverse selector valve 100 which may be of the general type shown in the U.S. Pat. No. 3,042,165 issued July 3, 1962 to Yokel and entitled "Fluid Actuated Friction Clutch" and which patent is assigned to an assignee common with the present application. A shuttle valve 102 is provided and senses when the forward clutch 16 or the clutch 40 is engaged (or in neutral). Shuttle valve 102 is actuated as the pressure starts to rise in forward clutch 16 or reverse clutch 40, and the valve 102 then directs pressure flow to actuate the brake release and also serves to cut off the priority lubrication flow to the brake. The circuit furthermore includes a brake cooling valve 104, the ball check orifice of the clutch cooling valve 106 for the reverse clutch 40 and another valve 108 for cooling of the forward clutch 16. A priority flow of lubricant is provided to these three valves. A brake release valve 110 is also provided in the circuit. All of the valves 104, 106, 108 and 110 are hydraulically actuated, as symbolically illustrated, and are spring returned. In the circuit shown in FIG. 7, the brake valve lay-out shows that clutch engaging pressure, either forward or reverse, is used to cause the shuttle valve 102 to move in the direction that applies clutch engaging pressure, as a pilot pressure, to the brake release spool of valve 110 that, when moved by the clutch engaging pressure, allows high pressure oil to enter the brake release cylinder 85 and initiate brake release. Simultaneously with that action a valve 104 which is operated by clutch engaging pressure, cuts off the priority lubricant and cooling flow of fluid to the brake plate stack of brake 60 and also directs a priority flow of lubricant and cooling fluid to the engaging clutch plate pack to the engaging clutch. If the operator control lever 111 is then again moved to neutral, the pilot pressure decays in the portion of the selector valve 100 that had been directing priority cooling flow to the engaged clutch by the action of valve 106 or 108 and thus the valve spool shifts to stop this priority flow of fluid. At the same time, the pilot pressure to the brake cooling spool 104 goes to zero and that cavity is vented to the sump, thereby priority lubricant flow is again directed to the brake. A similar operation occurs on the brake release pilot cavity and this spool vents the brake release pressure to sump and the output shaft brake 60 to thereby engage by the combined action of the brake springs 87 and the brake boost piston 70.

FIG. 7A shows the modified brake of the completely hydraulically engaged type shown in FIG. 5A.

The pneumatic control unit 111 is supplied with compressed air (pneumatic fluid) at an inlet port 120 for delivery through forward and reverse valves 122 and 123, respectively, to outlet ports 124 and 125, respectively, from a pressured air supply, such as a motor-driven pump 127. The valves 122 and 123 are operable in response to the position of a manual operating lever 130, which has neutral (N), forward (F) and reverse (R) positions. The valves 122 and 123 are also operable, under certain conditions hereinafter described, in response to a feedback responsive system 129 which is shown schematically in FIG. 7 and generally comprises a logic circuit 131, an interlock circuit 132 and a timing circuit 133. The feedback responsive system 129 receives input signals in the form of oil pressure in the oil supply lines 136, 137 and 138 which are connected, respectively, between system 129 and brake release valve 110, forward clutch 16, and reverse clutch 40. The control unit 111 is also connected as by a connection 140 to adjustably operate the throttle 141 of engine E to set engine speed at an appropriate speed in the range from idle speed to full speed.

The hydraulic system provides feedback pressure through line 136, which indicates to the control unit 111 if the brake 60 is engaged or released, and also provides feedback pressure through line 137 to indicate if the forward clutch 16 is engaged or released and furthermore provides feedback pressure through line 138 to indicate if the reverse clutch 40 is engaged or released. These feedback pressures are provided to the control unit 111 in FIG. 7 to permit sequencing from neutral to forward to reverse in the above described manner.

Figure 8:
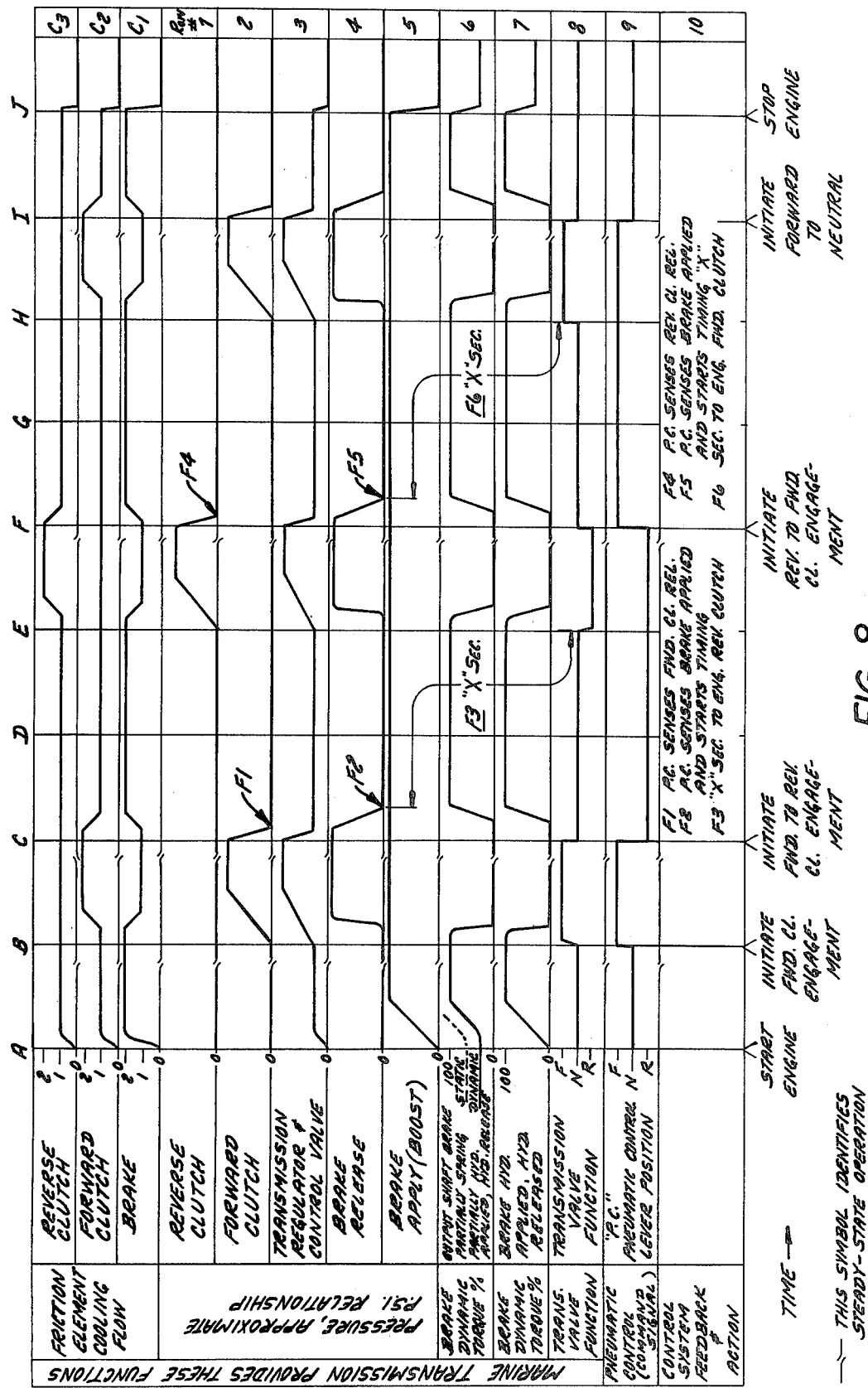
FIG. 8 is a chart outlineing the sequence of functions of various portions of the present system, rows Nos. 1 to 10 and columns A to J identifying steps in the operation of the system, the upper three rows showing the relationship of cooling oil flow to the three friction elements during control actuation.

FIG. 8 outlines the sequence of function in various portions of the system, such as the clutch engagement-brake release sequence, and the pneumatic control system interlock function. Rows are numbered 1–10 and columns A–J to identify steps in the operation.

Before the engine is started (A), the brake shows a dynamic torque capacity of 25% of design capacity (row 6). When the engine is started (A), brake "boost" pressure is available (row 5), and brake torque capacity increases to 100% of design capacity (row 6), also flow and pressure are available at the control valve 100 (row 3).

At "B" (FIG. 8) the operator moves the pneumatic control lever 111 from neutral to forward to initiate forward clutch engagement (row 9). This action pneumatically moves the control valve 100 from neutral to forward (row 8), and flow is directed to the forward clutch 16 and pressure builds up in the regulator valve 112 as a function of time (row 3), and also in the forward clutch (row 2).

Referring to FIG. 7 the same action, as described above with respect to FIG. 8, can be followed. The control valve 100 is shifted to the right pneumatically. Flow is directed to the forward clutch 16 and through the ballcheck orifice arrangement 106 causing the clutch regulator pressure to rise on a pressure vs. time ramp. The shuttle valve ball (or pistion) 102 moves to the right directing pressure to the brake release valve 110 which in turn directs high pressure oil to the brake release piston 60 to release the brake. The brake clutch cooling valve 104, the reverse clutch cooling valve 106 and the forward clutch cooling valve 108 direct priority cooling flow to friction components as engagement of each of these components begins under the action of pressure to the friction component that is starting to engage.

At "C" (FIG. 8) the operator moves the pneumatic control lever 130 from forward, across neutral to reverse. The control valve 100 is moved from forward to neutral pneumatically (row 8), but is prevented by pneumatic control interlocks 132 from moving into reverse. The pneumatic control interlock sequence first is $F_1$ sensing forward clutch released, $F_2$ sensing brake engaged which initiates timing of "X" seconds of brake engagement (C to E). This is a pneumatic control system function that must be completed before the transmission control valve 100 is permitted to move from neutral to reverse at "E". As pressure starts to build up on the reverse clutch 40 (row 1), the brake is released (row 4), and the reverse clutch is engaged as pressure continues to build up (row 1, E to F). Following the same sequence in FIG. 7, the valve 100 is moved from forward clutch engagement to neutral under the action of the pneumatic control unit 111. The loss of forward clutch pressure at valve 100 is communicated through valve 102 to valve 110 and thus removes pressure from the brake release so the brake is engaged under the action of the spring force plus the "boost" pressure. This condition is maintained for "X" seconds by the pneumatic control system timing circuit 133 which then moves valve 100 pneumatically to direct pressure to engage the reverse clutch 40, and to build up pressure on a time ramp by action of pressurized oil through valves 106 and clutch regulating valve 112. As pressure starts to build up in the reverse clutch 40, it is communicated through valve 102 to valve 110 which releases the brake. Reverse clutch engagement is then completed.

The FIG. 8 control system operation then continues from column F through J to show a reverse through neutral to forward shift (F to I), a forward to neutral shift at I, and engine shut-down at J. Thus, there is provided a hydraulic control circuit for the transmission and pneumatic control system for sequencing the transmission from neutral to forward or reverse, and pneumatic controls set engine speed in the range from idle speeds to full speed.

In the integrated pneumatic transmission and engine speed controls with the hydraulic transmission controls, the transmission hydraulic control circuit includes connections, such as the lines 136, 137, 138, by which hydraulic pressure signals can be directed to the pneumatic control system logic circuit 131 to show (1) if the brake 60 is engaged or released, (2) if the forward shaft clutch 16 is engaged or released and (3) if the reverse shaft clutch 40 is engaged or released. These hydraulic pressure signals are integrated by the pneumatic control logic circuit 131, for example, (1) to signal the pneumatic logic that the brake 60 is engaged and, thus, operation of timing circuit 133 can be initiated to engage the opposite rotation clutch 16 or 40, and (2) to signal the pneumatic logic that hydraulic pressure is rising in a clutch cylinder which will impose a load on the engine E. In this manner a signal can be generated by the pneumatic control logic circuit 131 to operate throttle 141 to boost engine E speed during this time period, and thereby prevent engine stalling.

I claim:

1. A marine power transmission of the type having a change speed gear system mounted in a housing and including a forward shaft, a reverse shaft and an output shaft journalled in said housing, said shafts having gears fixed thereto for rotation therewith whereby power can be transmitted through the gears of said shafts to obtain different speed ratios and directions of output shaft rotation, said forward shaft and said rearward shaft each having a friction plate type, hydraulically actuated clutch connected therewith, said forward shaft also having a friction plate type, hydraulically actuated brake concentrically mounted therearound and operatively connectible between said forward shaft and said housing whereby said forward shaft can be braked against rotation by being anchored to said housing, said forward shaft and said output shaft having a transmission gear set therebetween whereby braking of said forward shaft acts to brake said output shaft through said transmission gear set, said output shaft connected to a propeller for rotatably driving the latter in either direction of rotation, said transmission also having a hydraulic control circuit connected with said clutches and said brake for actuation thereof, said circuit also including an operator controlled, forward-neutral-reverse selector valve, a shuttle valve, a brake release valve, a brake cooling valve and a clutch cooling valve for each of said clutches on said forward and reverse shafts, said selector valve being operable to actuate said clutches so that said transmission can be selectively in forward, neutral or reverse conditions of operation, said shuttle valve being actuated upon commencement of engagement of said forward shaft clutch or reverse shaft clutch to thereby direct pressure fluid flow to actuate said brake release valve and thereby causing said brake to be released, valve means for providing a priority flow of lubricant to said brake cooling valve and to said clutch cooling valves when either of the respective clutches of said cooling valves are engaged, and cuts off priority flow of lubricant to said brake.

2. The transmission set forth in claim 1 including a pneumatic control for sequencing from neutral to forward to reverse, by utilizing feedback pressure to signal the selector valve if (1) the brake is engaged or released, (2) if the forward shaft clutch is engaged or released, and (3) if the reverse shaft clutch is engaged or released.

3. A transmission for a marine propulsion system comprising:

a housing;

a rotatable input shaft journalled in said housing;

a reversibly rotatable output shaft journalled in said housing;

forward and reverse shafts rotatably mounted within said housing;

gears in said housing connected between each of said forward and reverse shafts and said output shaft;

a first clutch in said housing connected between said input shaft and said forward shaft;

a second clutch in said housing connected between said input shaft and said reverse shaft;

a brake in said housing releasably engageable with said forward shaft to prevent rotation of said forward shaft and said output shaft;

and control means selectively operable to engage said brake and disengage both clutches and to disengage said brake and engage one of said clutches, said clutches and said brake being hydraulically actuated and including means for supplying hydraulic fluid to operate said clutches and said brake, and said control means comprising a shuttle valve responsive to hydraulic fluid flow which effects commencement of operation of either of said clutches to effect release of said brake.

4. A transmission according to claim 3 further comprising a source of fluid for lubrication and cooling purposes, and wherein said control means further comprises a signal valve responsive to commencement of operation of either of said clutches to divert priority flow of said lubrication and cooling fluid from said brake to whichever clutch is being engaged.

5. A transmission for a marine propulsion system comprising:

a housing;

a rotatable input shaft journalled in said housing;

a reversibly rotatable output shaft journalled in said housing;

forward and reverse shafts rotatably mounted within said housing;

gear trains in said housing connected between each of said forward and reverse shafts and said output shaft;

a first friction plate type hydraulically actuated clutch in said housing connected between said input shaft and said forward shaft;

a second friction plate type hydraulically actuated clutch in said housing connected between said input shaft and said reverse shaft;

a friction plate type hydraulically actuated brake in said housing releasably engageable with said forward shaft to prevent rotation of said forward shaft and said output shaft;

means for supplying hydraulic fluid to operate said first and second clutches of said brake;

and control means including a shuttle valve and selectively operable to select a neutral position wherein hydraulic fluid is supplied to engage said brake and wherein both clutches are disengaged, to select a forward position wherein said first clutch commences engagement and said shuttle valve effects release of said brake, and to select a reverse position wherein said second clutch commences engagement and said shuttle valve effects release of said brake.

6. A transmission according to claim 5 further comprising a source of fluid for lubrication and cooling purposes, and wherein said control means further comprises a signal valve responsive to commencement of operation of either of said clutches to divert flow of said lubrication and cooling fluid from said brake to whichever clutch is being engaged.

7. A transmission according to claim 5 or 6 wherein said control means further comprises feedback means responsive to the condition of said clutches and said brake to effect predetermined sequential operation of said clutches and said brake when said control means is operated to shift from forward to reverse through neutral or to shift from reverse to forward through neutral.

* * * * *